Patented Dec. 27, 1949

2,492,677

UNITED STATES PATENT OFFICE 2,492,677

MANUFACTURE OF RESINS FROM TAR ACIDS AND OILS OBTAINED FROM COAL TAR DISTILLATES

Harry L. Allen, Philadelphia, Pa., and Earl G. Kerr, Haddonfield, N. J., assignors to Allied Chemical & Dye Corporation, New York, N. Y., a corporation of New York No Drawing. Application September 29, 1945, Serial No. 619,425

3 Claims. (Cl. 260—57)

This invention is directed to processes for making resins and to resin products obtainable by practice of such processes.

The primary object of the invention lies in provision of processes for making thermoplastic transparent resins which are soluble in coal tar thinners and alcohol, and which are compatible with vegetable oils e. g. China-wood oil paracoumarone-idene resins, ester gum, rosin, alkyd resins, nitrocellulose, ethyl cellulose and other substances used in manufacture of coating compositions. Another object is to afford production of resins which, when mixed with certain alkyd resins, form remarkably fast-drying coating compositions. A further important object is provision of procedure by which, if desired, resins of the invention may be produced in a single reaction stage, i. e. by co-polymerization of all of the reactants involved. Other objects and advantages of the invention will appear from the following description.

We have found that certain hereindescribed oils, derived from acid sludges resulting from the sulfuric acid refining of coal tar distillates, possess physical and chemical characteristics and properties of such nature that the use of these oils, in a polymerization operation and in conjunction with certain other ingredients, effects production of resins having the above stated sought-for properties. Also, we have discovered that such oils, by reason of their particular and peculiar properties, make it possible to produce the resins of the invention in a single reaction stage, that is, the oils together with the other hereindescribed ingredients used in carrying out the process may be co-polymerized in a suitable reaction vessel to form the new resin products.

Practice of the invention involves the step of reacting, preferably with the aid of a catalyst, tar acid, formaldehyde and a distillate oil boiling within the range of 225°–400° C., and obtained by destructive distillation of neutralized carbonaceous constituents of acid sludge produced in the sulfuric acid refining of coal tar distillate. In a preferred embodiment, the invention comprises co-polymerizing, in the presence of a catalyst, the tar acid, formaldehyde and the particular oil employed.

A preferred method for making the oils used in practice of the invention is as follows:

Acid sludges which may be employed as starting materials are those derived from sulfuric acid purification of crude coal tar distillate oils such as crude benzol, toluol, crude naphthalene, crude solvent naphtha and crude hi-flash solvent. Although compositions of such sludges vary widely, composition of representative suitable acid sludges are about as follows: 20–60% $H_2SO_4$, 0.1–10% oil and naphthalene, and 3–50% pitch.

The acid sludge utilized is treated with water under conditions to form a mass comprising tarry material herein designated as acid pitch, and aqueous relatively weak sulfuric acid. Preferably, the raw acid sludge is diluted with 15 to 25 parts by weight of water, agitated, and held at temperature of 75° to 102° C. for a period of time ranging from ¼ to ½ an hour, the equipment employed being such as to facilitate maintenance of agitation and the temperature conditions stated. This operation results in separation of the tar from the sludge and the leaching out of most of the sulfuric acid into the water layer. On settling for an interval of 3 to 4 hours, the mass stratifies to an under layer of relatively weak sulfuric acid and an upper layer of solid and semi-liquid acid pitch containing substantial quantity of occluded sulfuric acid. The impure weak sulfuric acid solution, which may have an $H_2SO_4$ concentration of 35 to 45%, and the acid pitch are separated by any suitable means e. g. by drawing off the under layer of weak acid. In this operation, at least most of the weak sulfuric acid is separated from the acid pitch, although after decantation, the acid pitch usually contains an appreciable amount of weak sulfuric acid solution. The described water treatment step effects easy separation and removal from the crude acid sludges of certain water and/or acid soluble materials such as sulfonates which, if not thus removed, would be carried thru the process and be only difficultly separable at a subsequent process stage or alter the character of the final product.

The acid pitch is then treated with a suitable neutralizing agent under conditions to completely neutralize substantially all of the remaining sulfuric acid associated with the acid pitch. Neutralizing agents such as caustic soda, lime, sodium carbonate, calcium carbonate, and magnesia may be used for this purpose. To facilitate operation and procure adequate neutralization of residual sulfuric acid, the neutralizing agent is used preferably in the form of a water solution containing sufficient neutralizing material to completely neutralize residual sulfuric acid present in the acid pitch, the amount of water as such being enough as to form an acid pitch-neutralizing agent mass which is relatively fluid and readily agitatable. Neutralization is preferably carried out in a vessel equipped with an agitator and provided with means to maintain temperatures in the vessel from room temperature to about 105° C., usual neutralizing temperature being about the boiling temperature of the mass formed by addition of the neutralizing solution to the acid pitch. Time required for neutralization may vary from 15 minutes to 5 hours depending upon physical nature of the acid pitch, i. e. whether fairly finely divided or relatively lumpy. Usually, the quantity of water employed amounts to from 1 to 2 parts by weight of the acid pitch, and the quantity of neutralizing agent depends of course upon the $H_2SO_4$ content of the acid pitch, and the alkalinity of the specific neutralizing agent used in the particular operation. End point of the neutralization operation may be determined by any suitable test applied to a representative sample of the mass in the neutralizer.

When the condition of neutralization is attained, the neutralized acid pitch may be separated from the aqueous phase as by filtration or centrifuging. If desired the separated acid pitch may be washed one or more times with water. Preferably, substantially all the aqueous phase is separated from the pitch, although in some instances the acid pitch may contain 10–25% by weight of occluded water.

The neutralized acid pitch is then destructively distilled under certain destructive distillation conditions which result in production of the preferred oils used in practice of the present improvements.

The neutralized acid pitch is charged into a still which may be either cold or preliminarily heated to moderate temperature, say of the order of 150–175° C. The still is externally heated, i. e. constructed and operated in such a way that there is no direct contact between hot fire gases and the body of batch of acid pitch undergoing distillation. The equipment is designed for distillation at atmospheric pressure and is provided with a vapor offtake connected with the inlet of a suitable condenser. Regardless of particular construction of the still and the mode of heating, the operation is such that at the time of charging the still, vapor temperature of any vapors more or less immediately exiting the distillation zone are about 100–125° C. Firing of the still is controlled so that thereafter temperature in the distillation zone increases, preferably at a relatively smooth gradient, to a point such that vapor temperature of the oil vapors exiting distillation approaches but does not substantially exceed 400° C. At significantly higher vapor temperatures, the oils begin to decompose. Distillation of the body of acid pitch is carried out in the distillation zone in the absence of extraneous steam, oxidizing material, or other modifying agent which might alter the characteristic properties of the distillate oils.

The distillation operation is proceeded with for a period of time such that the distillation zone residue is reduced to a relatively dry, solid coke-like mass. Distillation time may vary considerably depending principally upon the size of the acid pitch charge, and upon the design of the particular equipment employed.

The vapors discharged from the distillation zone may be condensed in any suitable way. The resulting oily condensate is an oil predominantly aromatic in character and having a boiling range of 75°–400° C. and specific gravity at 25° C. of 0.990–1.000. The oils obtained by the foregoing process have physical and chemical characteristics differing substantially from oils obtained by destructive distillation of sludges or acid pitches derived from sulfuric acid refining of petroleum oils.

About 40% by volume of the total condensate boils at temperature of about 75–225° C., and the remainder at about 225–400° C. The preferred oils used in the resin manufacture process of this invention have a boiling point range of 250–400° C. If desired such a product may be fractionated out of the vapors leaving the distillation zone, or the total exit of the distillation zone may be liquefied and the condensate redistilled to recover the preferred 250–400° C. cut which is an unsaturated, dark brown oil having a clean and slightly terpene-like odor. Representative samples of this heavy fraction had specific gravity in the range of 0.990–0.996 at 25° C., contained about 14% paraffin type hydrocarbons by the sulfonation test method, and had viscosity of 75 centipoises at 25° C.

In the practice of one example of the above described process for making the oil used in accordance with this invention, the acid sludge employed was that resulting from a commercial operation in which 66° Bé. sulfuric acid was used for purification of crude benzol-toluol from drip oil, and the approximate composition of acid sludge was by weight 29% $H_2SO_4$, 9% oil and naphthalene, and 47% pitch. A quantity of this acid sludge was diluted with about 20% by weight of water, agitated, and boiled for about 15 minutes. After settling for about 3 hours, the under layer of weak sulfuric acid, having an $H_2SO_4$ concentration of about 40%, was drawn off.

1000 parts by weight of the acid pitch were mixed with 2130 parts by weight of an aqueous solution having an NaOH concentration of about 11%. The mass was agitated at temperature of about 25° C. for about 1 hour. The mass was settled and the supernatant aqueous phase was drawn off.

The neutralized acid pitch was charged into a cold still adapted to be externally heated. Heating was controlled so that temperature in the still was raised, by a relatively smooth gradient, to a point such that maximum vapor temperature of vapors exiting the still was about 395° C. Distillation was carried out at atmospheric pressure, and until the residue in the still was reduced to a relatively dry, solid coke-like mass. Distillation time was 3 hours. The vapors exiting the distillation zone were condensed in a simple total condenser, and during the entire operation, the distillate in the condenser remained completely fluid. There were recovered 315 parts by weight of oil having a boiling point range of 78–394° C. About 60% of this oil had a boiling point range of about 250–394° C.

While the preferred oils used in the resin manufacture operations of the present invention are best produced according to the above described procedure, other methods for making these oils may be employed. For example, if desired, the raw acid sludge may be directly neutralized with alkali, e. g. milk of lime, without first treating the acid sludge with water and separating the pitch from the sludge, and the neutralized sludge subjected directly to destructive distillation. The reference herein to destructive distillation of neutralized carbonaceous constituents of acid sludge is intended to include such direct distillation of neutralized acid sludge as well as distillation of previously water treated and neutralized acid pitch as hereinabove described. Also, destructive distillation may be carried out under any desirable degree of vacuum if desired.

The tar acids which may be used in making the resins of the invention include not only commercial tar acids which may contain phenol, cresols, cresylic acid, xylenols and their homologues in widely varying proportions, but also phenol, cresols, xylenols and their homologues in the form of individual compounds or mixtures of two or more of them, whether obtained from commercial coal tar or other sources. In the appended claims the term "tar acid" is intended to include such materials.

The formaldehyde employed is usually in the form of the 37% water solution of commerce. However, solutions of other strengths, and also paraformaldehyde may be used, and in the appended claims the term "formaldehyde" is intended to include paraformaldehyde.

The catalysts used in the present process may be alkaline catalysts such as ammonium and sodium hydroxides. The preferred catalyst is ammonium hydroxide which is usually used in the form of a 28% strength water solution.

Regardless of whether the polymerization operation is carried out as a two-stage process or, as preferred, in a single stage, when employing formaldehyde in the form of a 37% water solution, the proportions by weight of reactants introduced into the process may vary as follows: tar acid from 20 to 40%; 37% formaldehyde solution from 25 to 55%; and aromatic hydrocarbon oil from 4 to 40%; the preferred proportions being, tar acid from 30 to 40%, formaldehyde solution from 40 to 50%, and aromatic hydrocarbon oil from 10 to 30%.

In the preferred embodiment of the invention, all of the ingredients are co-polymerized in a single reaction stage. Such process may be carried out in a reaction vessel equipped with a heating jacket, a reflux condenser, and a connection to a vacuum apparatus to facilitate low pressure removal of unreacted constituents from the reaction zone after completion of polymerization. In one specific example of practice of carrying out the invention, 100 gms. of tar acid (xylenol) having a boiling point range of 210–217° C., 50 gms. of the hereindescribed heavy oil having a boiling point range of about 250–394° C., 130 gms. of 37% formaldehyde solution, and 10 ml. of ammonium hydroxide solution (28% NH3) were placed in a flask equipped with a reflux condenser and mechanical agitator. The temperature was raised within 15 minutes to reflux conditions (95–100° C.) and held for one-half hour. The mass was then distilled under absolute pressure of 1 inch of mercury to a temperature of 122° C. at which point the resin was poured. The resulting product was a soft, dark clean resin which was soluble in denatured ethyl alcohol and coal tar solvents, and insoluble in petroleum solvents. It was compatible with nitrocellulose and ethylcellulose solutions, also with vegetable oils, rosin, and ester gum. When this resin is mixed with certain alkyd resins there is formed a resinous blend which, when used as a coating, has a quick-drying time comparable with nitrocellulose lacquers.

If desired the polymerization operation may be carried out in a two-stage operation, i. e. the tar acid and the hydrocarbon oil may be reacted, and thereafter the formaldehyde added. In this instance, the tar acid, heavy oil and catalyst may be agitated at 110° C. for about ¼ hour, and the mass allowed to cool to about 70° C. The formaldehyde solution may be then added and the total mass brought up to reflux temperature while continuing agitation, final reaction requiring about ½ hour.

We claim:

1. The process which comprises heat polymerizing, in the presence of an alkaline catalyst selected from the group consisting of alkali metal and ammonium hydroxides, a tar acid selected from the group consisting of phenol and its homologues; formaldehyde; and a predominantly aromatic hydrocarbon oil boiling within the range of 225° to 400° C. and produced by (1) neutralization of acid pitch resulting from water treatment of acid sludge, obtained in the sulfuric acid refining of coal tar distillate, under conditions to remove a substantial portion of said acid and (2) destructive distillation of the neutralized acid pitch; and recovering a resin from unreacted constituents of the reaction mass, said resin being thermoplastic, soluble in coal tar thinners and alcohol, and compatible with vegetable oils, the amount of said tar acid being in the range 20–40 weight percent, the amount of said formaldehyde being equivalent to 25–55 weight percent of 37 percent aqueous solution, and the amount of said oil being in the range of 4 to 40 weight percent based on said tar acid, formaldehyde and oil.

2. The process which comprises heat polymerizing, in the presence of an alkaline catalyst selected from the group consisting of alkali metal and ammonium hydroxides, a tar acid selected from the group consisting of phenol and its homologues; formaldehyde; and a predominantly aromatic hydrocarbon oil boiling within the range of 225° to 400° C. and produced by (1) neutralization of acid pitch resulting from water treatment of acid sludge, obtained in the sulfuric acid refining of coal tar distillate, under conditions to remove a substantial portion of said acid and (2) destructive distillation at substantially atmospheric pressure of the neutralized acid pitch; and recovering a resin from unreacted constituents of the reaction mass, said resin being thermoplastic, soluble in coal tar thinners and alcohol, and compatible with vegetable oils, the amount of said tar acid being in the range 30–40 weight percent, the amount of said formaldehyde being equivalent to 40–50 weight percent of 37 percent aqueous solution, and the amount of said oil being in the range 10–30 weight percent based on said tar acid, formaldehyde and oil.

3. The resin product obtained by the process of claim 1.

HARRY L. ALLEN.
EARL G. KERR.

REFERENCES CITED

The following references are of record in the file of this patent:

UNITED STATES PATENTS

| Number | Name | Date |
|---|---|---|
| 1,252,507 | Tarasoff et al. | Jan. 8, 1918 |
| 2,247,411 | Rostler et al. | July 1, 1941 |

FOREIGN PATENTS

| Number | Country | Date |
|---|---|---|
| 320,891 | Great Britain | Oct. 23, 1929 |
| 460,973 | Great Britain | Feb. 8, 1937 |